US008985951B2

(12) United States Patent
Rauber et al.

(10) Patent No.: US 8,985,951 B2
(45) Date of Patent: Mar. 24, 2015

(54) MULTIPLE-YOKE MAIN ROTOR ASSEMBLY

(75) Inventors: Richard E. Rauber, Euless, TX (US);
Frank B. Stamps, Colleyville, TX (US);
David A. Popelka, Colleyville, TX (US);
Patrick R. Tisdale, Roanoke, TX (US);
Tommie L. Wood, Pantego, TX (US)

(73) Assignee: Textron Innovations Inc., Providence, RI (US)

( * ) Notice: Subject to any disclaimer, the term of this patent is extended or adjusted under 35 U.S.C. 154(b) by 649 days.

(21) Appl. No.: 13/324,363

(22) Filed: Dec. 13, 2011

(65) Prior Publication Data

US 2013/0149151 A1  Jun. 13, 2013

(51) Int. Cl.
*B64C 27/43* (2006.01)
*B64C 29/00* (2006.01)

(52) U.S. Cl.
CPC ............. *B64C 27/43* (2013.01); *B64C 29/0033* (2013.01)
USPC .......................................... 416/141; 416/148

(58) Field of Classification Search
CPC .......... B64C 27/43; B64C 27/41; B64C 27/37
USPC ...................... 416/141, 124, 134 A, 148, 102
See application file for complete search history.

(56) References Cited

U.S. PATENT DOCUMENTS

| | | | | |
|---|---|---|---|---|
| 2,949,965 | A * | 8/1960 | De Tore et al. | 416/114 |
| 3,625,631 | A | 12/1971 | Covington et al. | |
| 4,874,291 | A | 10/1989 | Roberts et al. | |
| 5,370,341 | A * | 12/1994 | Leon | 244/17.11 |
| 6,439,849 | B1 * | 8/2002 | Sehgal et al. | 416/134 A |
| 7,100,866 | B2 * | 9/2006 | Rehkemper et al. | 244/17.13 |
| 7,198,223 | B2 * | 4/2007 | Phelps et al. | 244/17.11 |
| 8,052,500 | B2 * | 11/2011 | Van de Rostyne et al. | 446/36 |
| 2002/0109044 | A1 * | 8/2002 | Rock | 244/17.23 |

FOREIGN PATENT DOCUMENTS

| | | |
|---|---|---|
| GB | 272871 | 5/1927 |
| WO | 2004103814 A1 | 12/2004 |
| WO | 2008092022 A1 | 7/2008 |

OTHER PUBLICATIONS

Canadian Office Action dated Dec. 19, 2013 from counterpart foreign CA Application No. 2,794,228.
European Search Report dated Mar. 19, 2010 from counterpart foreign EP Application No. 12150684.4 7.
Office Action dated Aug. 8, 2014 from counterpart CN App. No. 201210413280X.

* cited by examiner

*Primary Examiner* — Richard Edgar
(74) *Attorney, Agent, or Firm* — James E. Walton

(57) ABSTRACT

The present application includes a main rotor assembly for an aircraft. The rotor assembly has a main rotor mast configured for rotation about a mast axis and two yokes pivotally connected to the mast for rotation therewith about the mast axis. Each yoke is independently pivotable relative to the mast about at least one flap axis that is generally perpendicular to the mast axis. In at least one embodiment, a torque splitter connects the yokes and allows for limited rotation of the yokes relative to each other about the mast axis. Each yoke is configured for the attachment of rotor blades extending generally radially relative to the mast axis.

12 Claims, 15 Drawing Sheets

MULTIPLE-YOKE MAIN ROTOR ASSEMBLY

BACKGROUND

1. Field of the Invention

The present application generally relates to rotors for aircraft and specifically relates to a multiple-yoke main rotor assembly for aircraft.

2. Description of Related Art

Demand is increasing for rotary-wing aircraft, such as helicopters and tiltrotors, to provide more thrust, higher speeds, and carry heavier loads and/or heavier fuselages. For example, there is a demand for more powerful tiltrotor aircraft. Where performance criteria such as these are to be increased, the functional systems of the rotary-wing aircraft must be improved to provide the desired resultant performance enhancements. The rotor system is one of the many functional systems which require improvement in order to meet the demand for improved rotary-wing aircraft performance.

Rotary-wing aircraft have at least one rotor for providing lift and propulsion forces. These rotors have at least two airfoil blades connected to a central hub, and the hub is mounted on a rotatable mast driven in rotation by an engine or motor. These blades may be adjustable for pitch angle, and the pitch angle is typically controlled by a swashplate assembly and linkage for connecting a rotating portion of the swashplate assembly to each blade.

Existing rotor assemblies have many configurations. One example of a prior-art system is a teetering rotor, in which a yoke attaches the blades to a central hub, and the yoke is pivotally attached to the mast, allowing for the yoke to teeter about a central flap axis that intersects the mast axis. FIG. 1 is a schematic view of a teetering system 11 mounted to a mast 13. Yoke 15 has two blades 17 attached at opposite ends of yoke 15, and yoke 15 is pivotally attached to mast 13 for rotation therewith about mast axis 19. To provide for a pivoting connection to mast 13, opposing cylindrical trunnions 21 extend radially from mast 13, defining flap axis 23. This configuration allows the rotor assembly of yoke 15 and blades 17 to freely pivot, or "teeter," about flap axis 23 relative to mast 13, as indicated by directional arrows 25. This type of rotor system has been used, for example, as a main rotor system on the Bell UH-1 Iroquois helicopter.

A twin teetering system 27, as shown in schematic form in FIG. 2, has been used as a tail-rotor system, such as in the Boeing AH-64 Apache helicopter. Two yokes 15 each have two blades 17 attached at opposite ends of yokes 15, and yokes 15 are pivotally attached to mast 13 for rotation therewith about mast axis 19. To provide for a pivoting connection to mast 13, two pairs of opposing cylindrical trunnions 21 extend radially from mast 13, defining flap axes 23. This configuration allows the rotor assemblies of each yoke 15 and the associated blades 17 to freely "teeter" about the corresponding flap axis 23 relative to mast 13 and to each other, as indicated by directional arrows 25.

Although there have been significant developments in rotor systems, significant room for improvement remains.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

Figure 1:
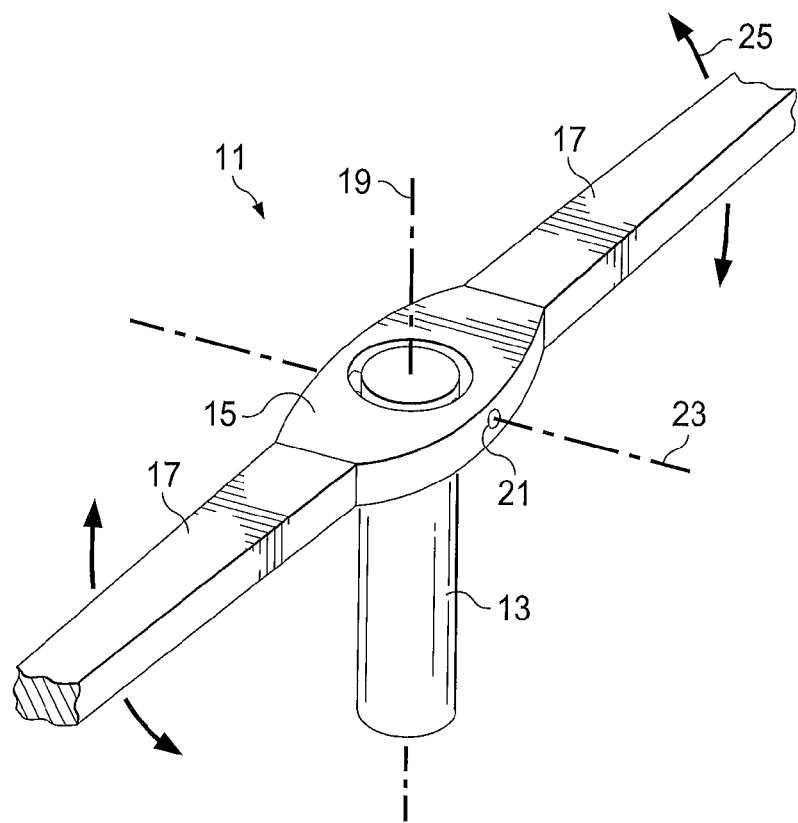
FIG. 1 is a schematic view of a prior-art main rotor system.
Figure 2:
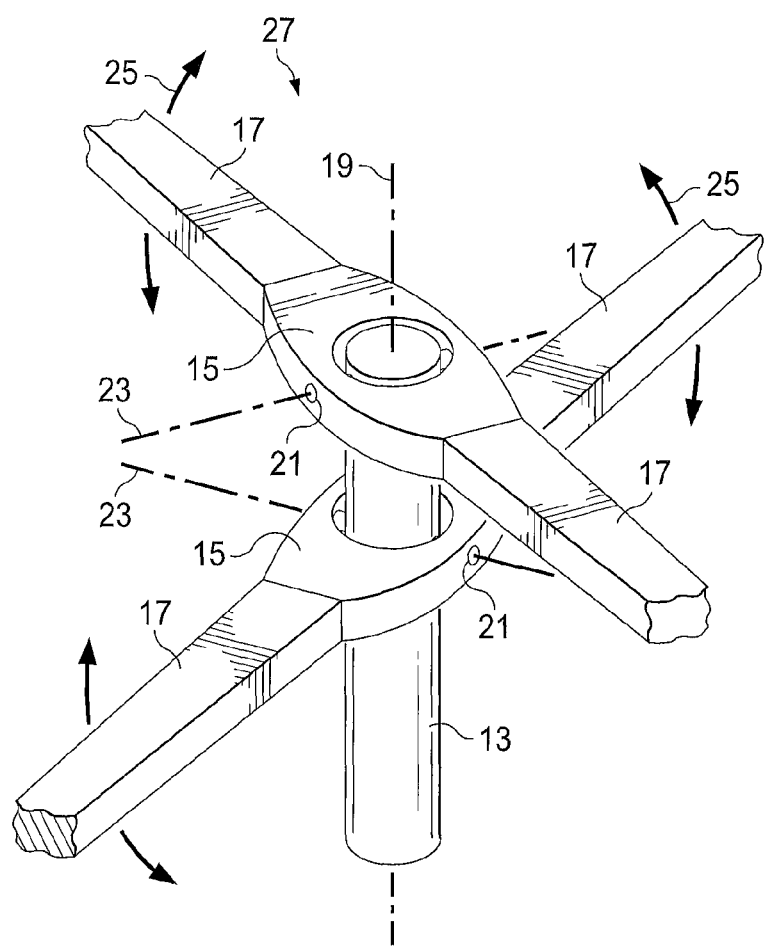
FIG. 2 is a schematic view of a prior-art tail rotor system.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DETAILED DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application discloses embodiments of a main rotor assembly having multiple yokes for connecting blades to a rotor mast for rotation therewith. Each of the multiple yokes may have two or more blades attached thereto, and the yokes may be connected to the mast with a teetering configuration, in which the yoke flap about one flap axis, or a gimbaled configuration, wherein the yokes are able to flap about at least two flap axes.

Figure 3:
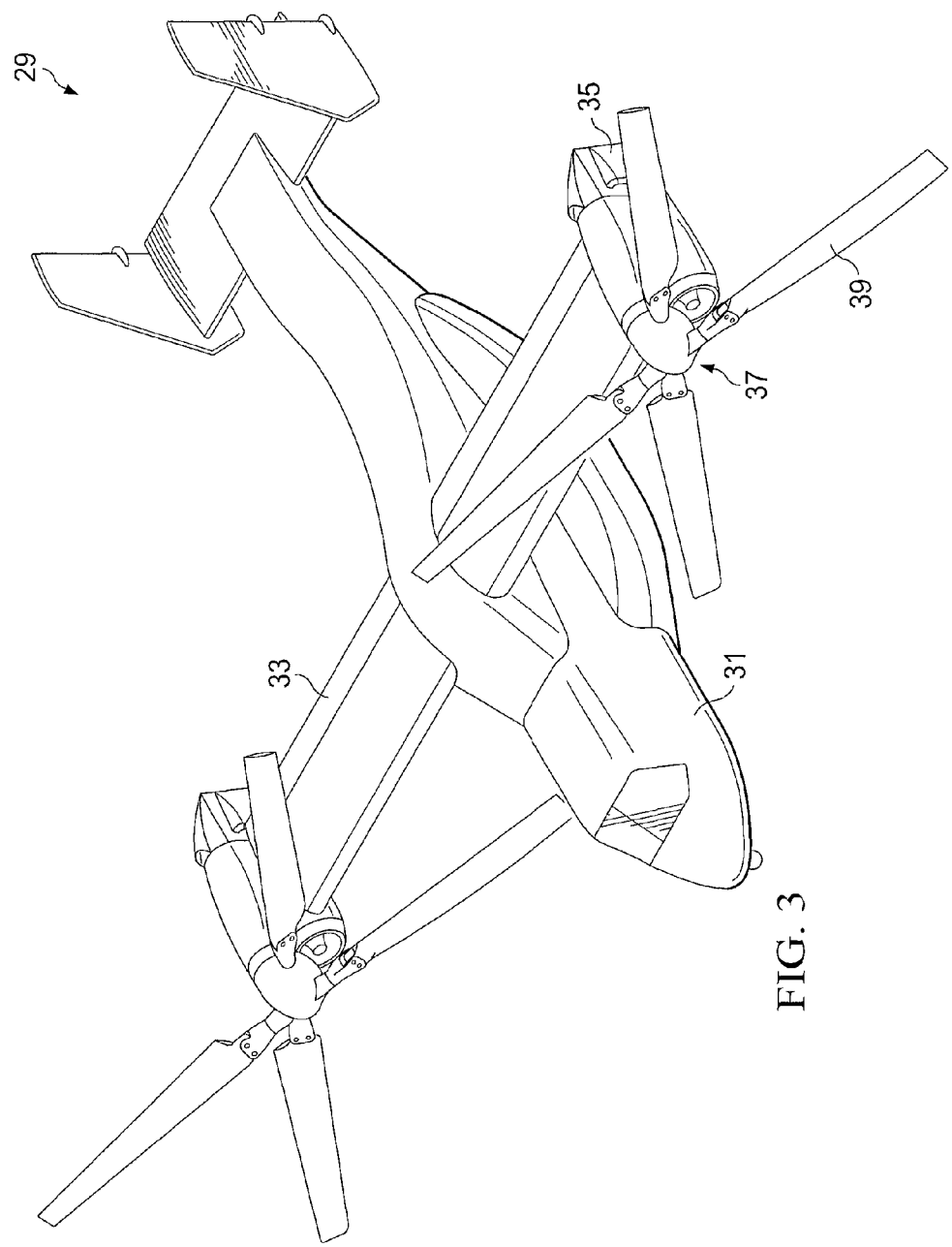
FIG. 3 is an oblique view of an aircraft with a multiple-yoke main rotor assembly installed.

Referring to FIG. 3, tiltrotor aircraft 29 includes a fuselage 31 and wing 33 attached to fuselage 31. Rotating engine nacelles 35 are pivotally mounted to opposing ends of wing 33 and house engines (not shown) for supplying torque to turn a rotor mast. A multiple-yoke main rotor assembly 37 is mounted on each mast for rotation therewith, each assembly 37 having two pair of blades 39. Tiltrotor 29 is capable of flying in a helicopter mode, in which each nacelle 35 is in an approximately vertical position, and flying in an airplane mode, as shown in the figure, in which each nacelle 35 is in an approximately horizontal position.

Tiltrotor 29 Is illustrated as an exemplary aircraft that may employ the system of the present application. It should be appreciated any variety of aircraft types may use the system of the present application for main rotors, and a non-exhaustive list of exemplary additional rotary-wing aircraft types may include helicopters and gyrocopters, including unmanned aircraft.

Figure 4:
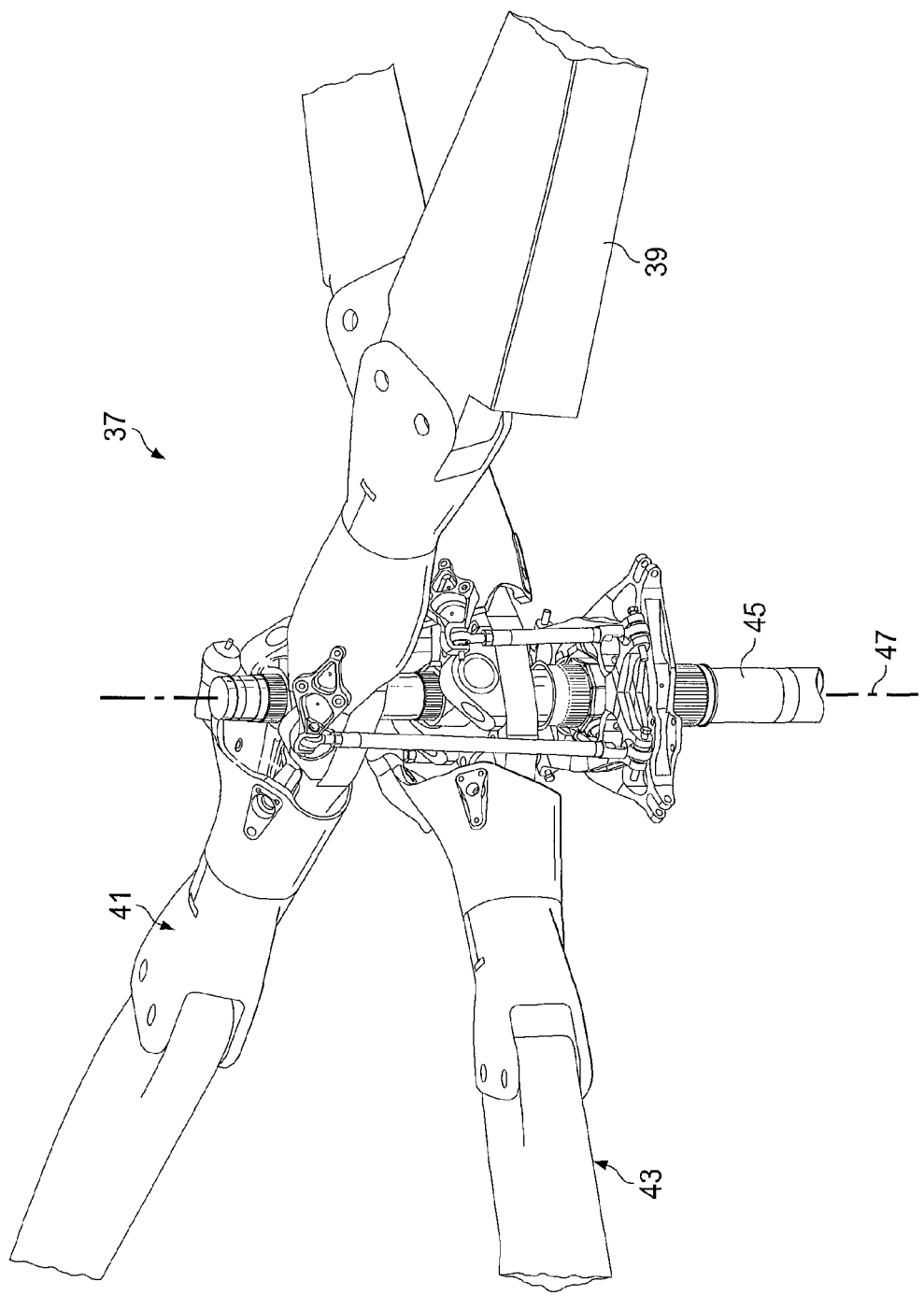
FIG. 4 is an oblique view of an embodiment of a multiple-yoke main rotor assembly.
Figure 5:
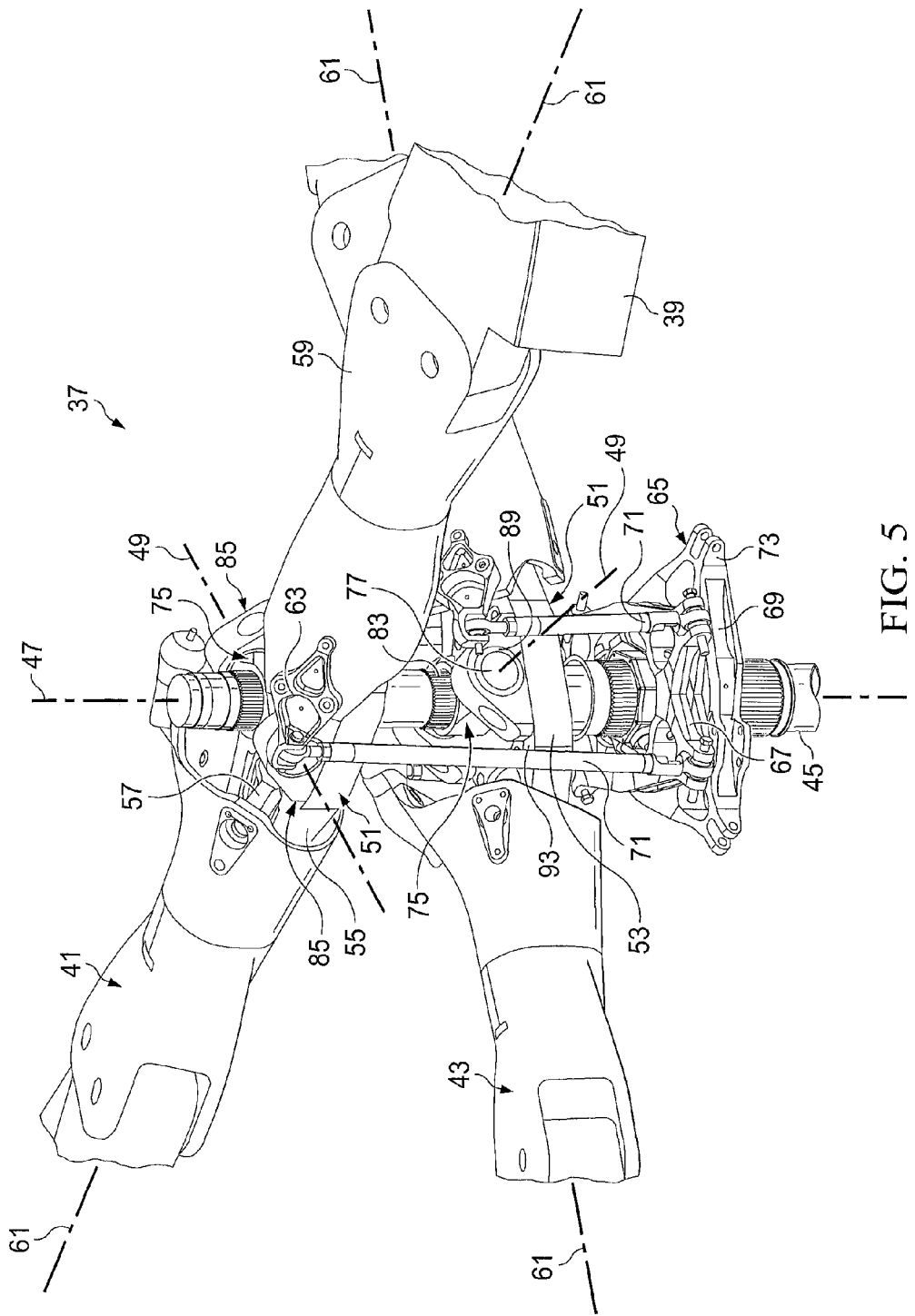
FIG. 5 is an enlarged oblique view of the rotor assembly of FIG. 4.
Figure 6:
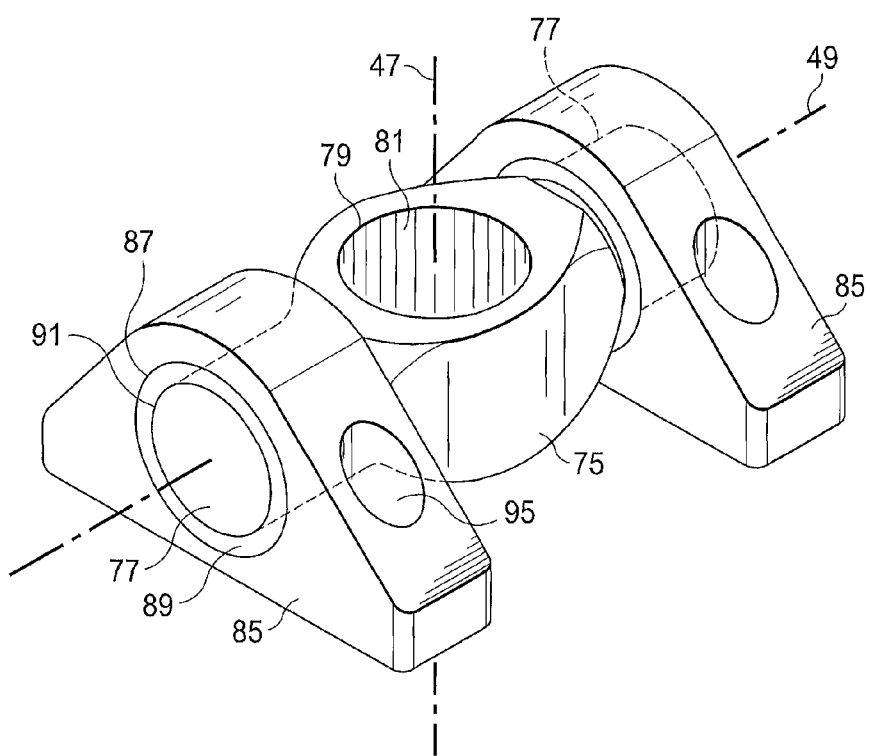
FIG. 6 is an enlarged oblique view of a portion of the rotor assembly of FIG. 4.

Referring now to FIGS. 4 through 6, rotor assembly 37 comprises an outboard rotor 41 and an inboard rotor 43. Each rotor 41, 43 is connected to a mast 45 for rotation therewith about a mast axis 47 as mast 45 is driven in rotation during operation of aircraft 29. Each rotor 41, 43 is independently pivotable relative to mast 45 about a single flap axis 49 that is perpendicular to mast axis 47. Rotors 41, 43 are described herein as having identical configurations, so as to have interchangeable components and be interchangeable between the outboard and inboard positions. The stacked, inboard/outboard configuration of rotors 41, 43 provides the advantage of placing blades 39 of inboard rotor 43 in the disturbed air of the wake of rotor 41, as compared to the undisturbed air encountered by blades 39 of outboard rotor 41. This configuration reduces the loads on blades 39 of rotor 43 and allows for rotors 41, 43 to cooperate to provide thrust comparable to a configuration with a single rotor having a larger diameter.

Each rotor comprises a yoke 51, and when yoke 51 is installed on mast 45, each yoke extends generally radially outward relative to mast axis 47. Yoke 51 has a central section 53 from which two opposing arms 55 extend radially. Arms 53 provide for mounting locations of bearing assemblies 57, with which a blade grip 59 is rotatably attached to each arm for rotation about a pitch axis 61. A blade 39 is attached to each grip 59 for rotation therewith about pitch axis 61. Each grip 59 has a pitch horn 63. A rise-and-fall swashplate 65 comprises a rotating portion 67 that rotates with mast 45 and a non-rotating portion 69, swashplate 65 being located inboard of rotors 41, 43. Rotating portion 67 is connected to pitch horn 63 of grips 59 of rotors 41, 43 with pitch links 71, so that translation and tilting of swashplate 65 relative to mast 45 provides for collective and cyclic control of the pitch of grips 59 and the attached blades 39. The translation and tilting of swashplate 65 is controlled by actuators connected to non-rotating portion 69 at clevises 73, and the selective motion of actuators are controlled by a flight control system in response to inputs from a pilot or automated flight system.

To provide for teetering of each yoke 51 about the associated flap axis 49, a sleeve 75 has two integral, opposing, coaxial trunnions 77 extending radially outward. As shown in detail in FIG. 6, sleeve 75 comprises a central aperture 79 sized for receiving a portion of mast 45, and aperture 79 has interior splines 81 for engaging corresponding splines 83 on mast 45. When installed on mast 45, sleeves 75 are rigidly connected to mast 45. In the embodiment shown, sleeves 75 are spaced from each other along the length of mast 45, which provides for flap axes 49 being spaced from each other. This location of each sleeve 75 determines the position of the attached rotor 41, 43 on mast 45. Also, flap axes 49, which are perpendicular to mast axis 47, are shown as being "clocked" 60 degrees relative to each other about mast axis, when viewed axially along mast axis 47, from a perpendicular orientation. One advantage of this relative orientation of flap axes 49 is that there is sufficient room between sets of nearby blades of rotors 41, 43 to allow for various types and configurations for required flight control systems, such as blade-pitch control systems.

As shown in detail in FIG. 6, a pair of pillow blocks 85 is used to connect each yoke 51 to the associated sleeve 75, each block 85 having an aperture 87 for housing a bearing 89. Bearing 89 is preferably an elastomeric bearing, but it may be of any appropriate type. Bearing 89 has an aperture 91 sized for receiving trunnion 77, allowing each pillow block 85 to rotate at least a limited amount relative to the attached trunnion 77 and sleeve 75. When assembled, the associated trunnion 77, bearing 89, and aperture 87 of pillow block 85 are coaxial and together define flap axis 49 for each sleeve 75.

To provide for pivoting of yoke 51 relative to mast 45, pillow blocks 85 for each sleeve 75 are attached to an outboard surface 93 of central section 53 of yoke 51. In the embodiment shown, two fastener apertures 95 are formed in each block 85 to allow for attachment of blocks 85 to yoke 51 with appropriate fasteners (not shown). As shown in the figures, blocks 85 are preferably attached to the outboard side of yoke 51, though alternative configurations may be used.

In operation, supplied torque drives mast 45 in rotation about mast axis 47, and splines 83 of mast 45 transfer the rotational motion to splines 81 of sleeve 75. As sleeve 75 rotates with mast 45, trunnions 77 cause pillow blocks 85 to rotate with sleeve 75 about mast axis 47. Pillow blocks 85 are attached to yoke 51, which causes yoke 51 to rotate with mast 45. While rotating about mast axis 47, yoke 51 and pillow blocks 85 are free to pivot relative to mast 45 and sleeve 77 about flap axis 49. This allows for flapping by teetering each rotor 41, 43 about the associated flap axis 49.

Figure 7:
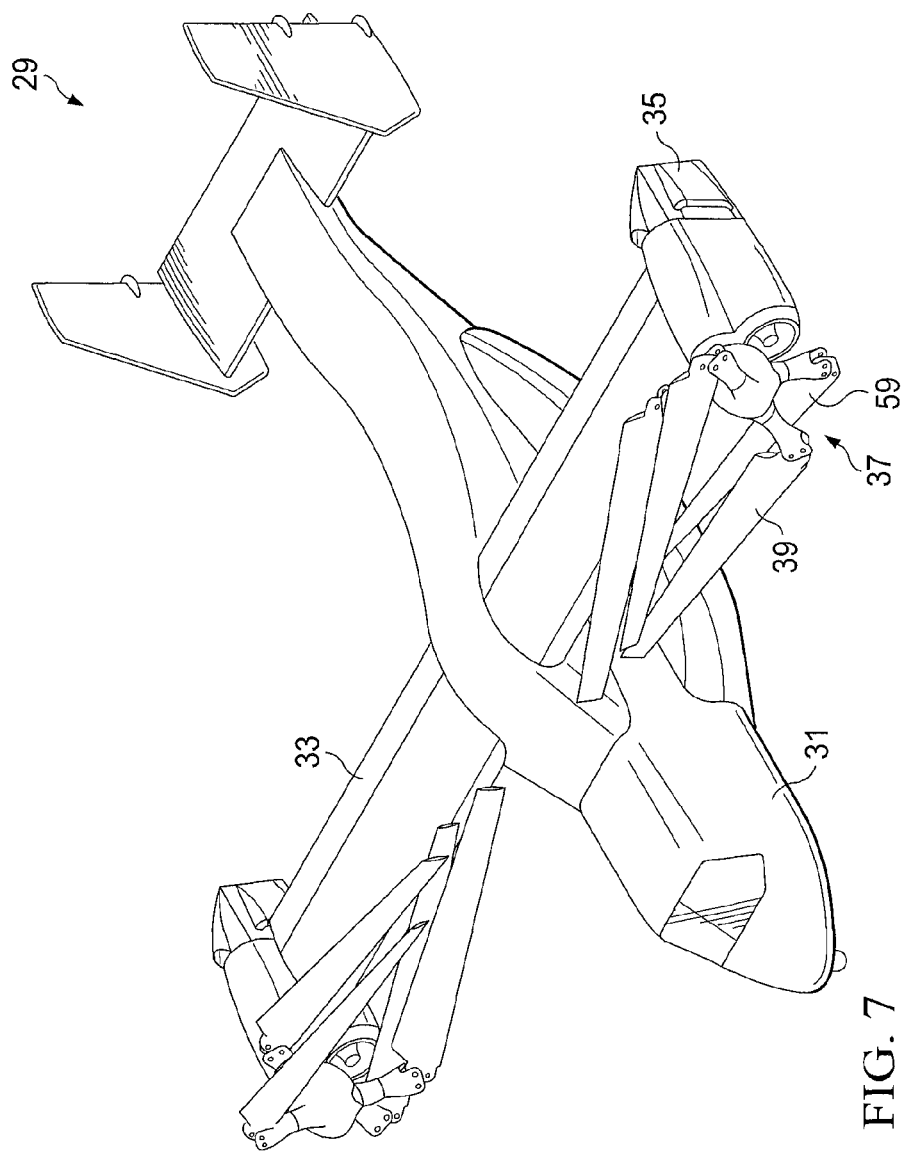
FIG. 7 is an oblique view of an aircraft with the rotor assembly of FIG. 4 installed, attached blades being in a folded position.

FIG. 7 illustrates another advantage of using the 60-degree orientation of main rotor assembly 37 on aircraft 29. Blades 39 of assembly 37 are shown in a folded position, in which an inner portion of blades 39 is partially decoupled from grips 59 to allow for blades 39 to rotate relative to grips 59. Aerodynamic considerations may make it preferable to have flap axes 49 as close to perpendicular to each other as possible, but, as described above, packaging and design considerations may lead to the selection of an offset, which also provides for ease of blade folding.

Figure 8:
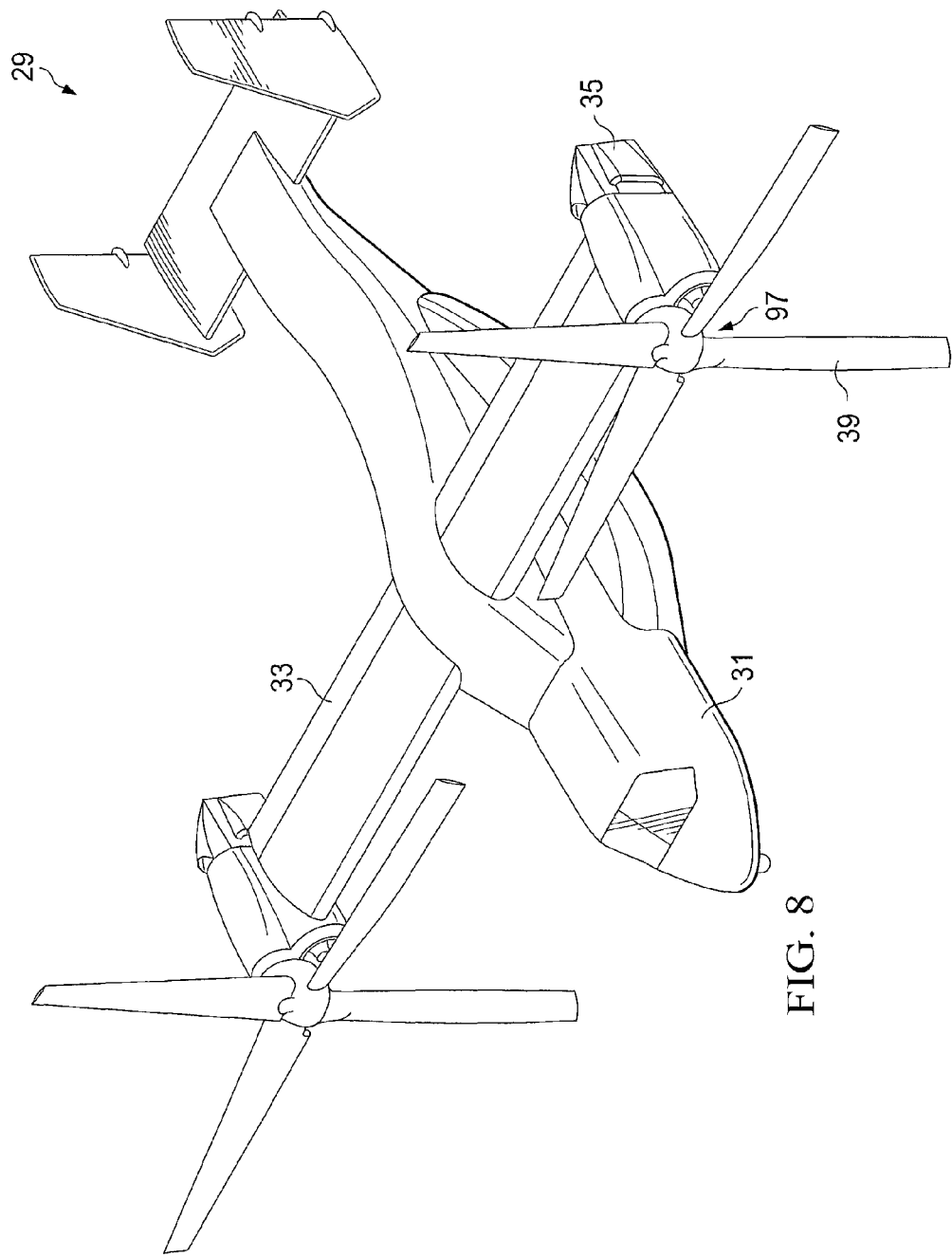
FIG. 8 is an oblique view of an aircraft with an alternative embodiment of the rotor system of FIG. 4 installed.

FIG. 8 illustrates aircraft 29 with an alternative embodiment of a multiple-yoke main rotor assembly 97. Assembly 97 is constructed in a similar manner to assembly 37, as described above, and with similar components. However, assembly 97 is constructed so that flap the axes of the two rotors are perpendicular to each other when viewed axially along the mast axis. While this orientation may be preferable for aerodynamic considerations, this configuration may limit the ability of blades 39 to fold and may limit the number of suitable designs due to limited space between blades 39.

Figure 9:
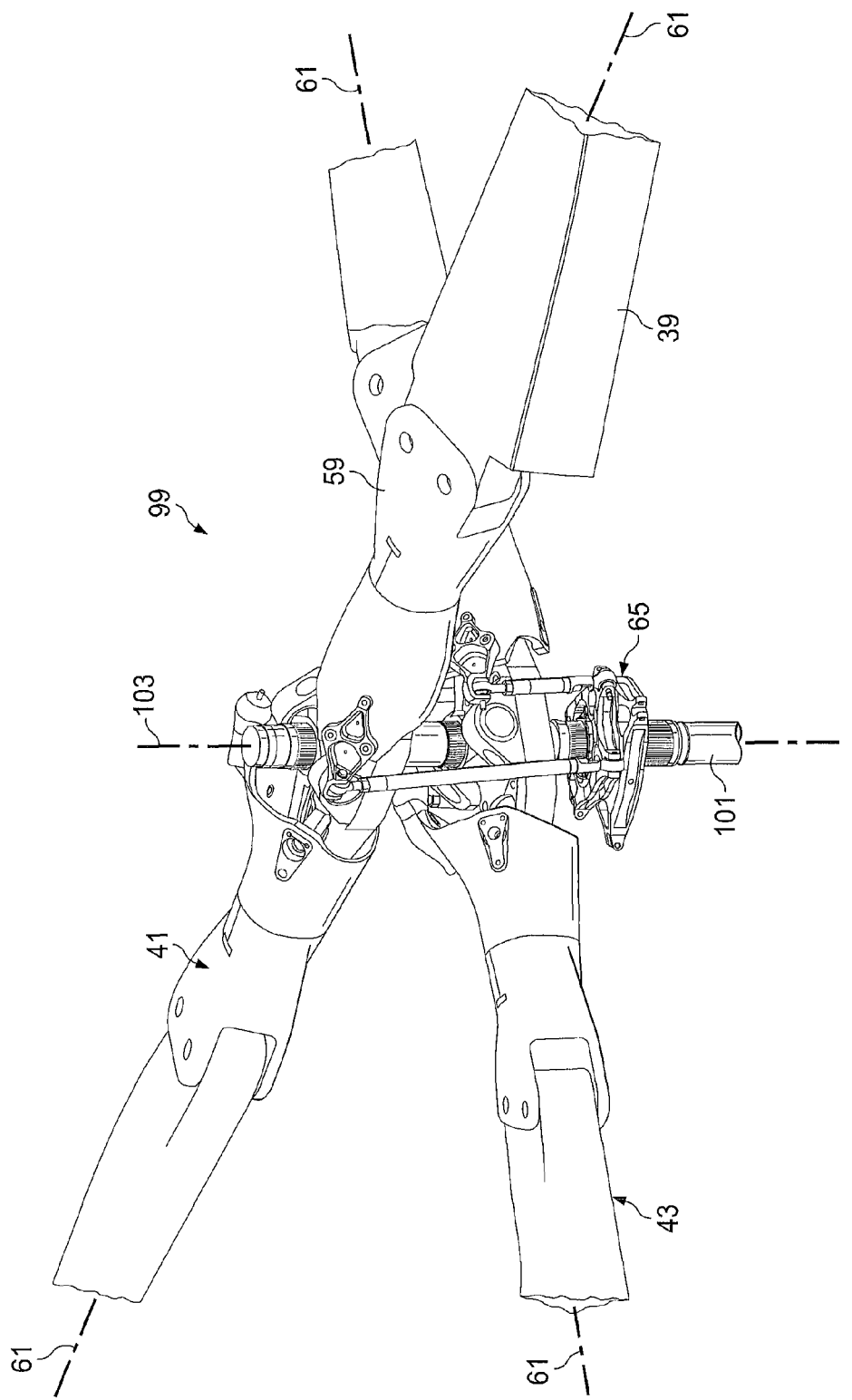
FIG. 9 is an oblique view of an alternative embodiment of a multiple-yoke main rotor assembly.
Figure 10:
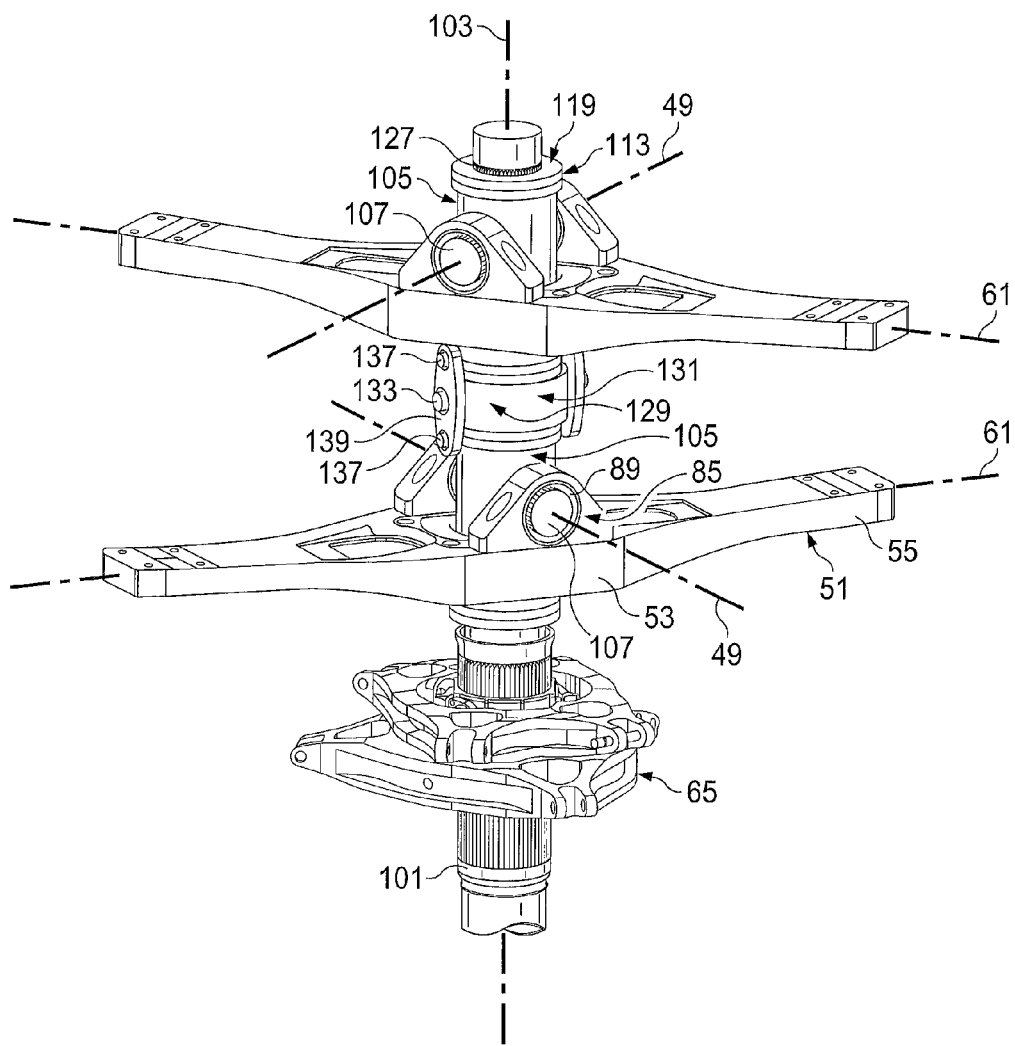
FIG. 10 is an enlarged oblique view of the rotor assembly of FIG. 9, portions of the assembly having been removed for ease of viewing.
Figure 11:
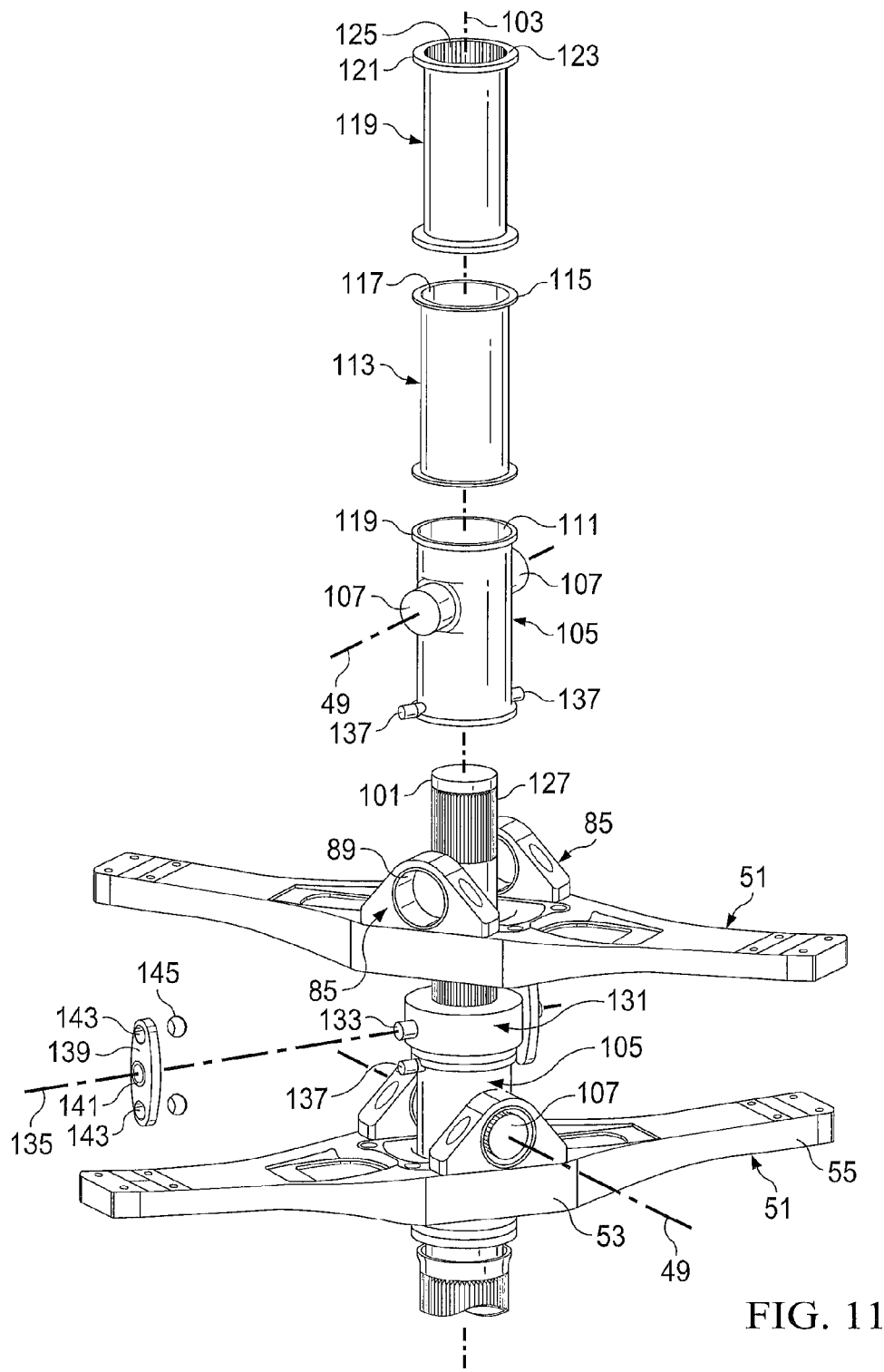
FIG. 11 is an oblique exploded view of the rotor assembly of FIG. 9, portions of the assembly having been removed for ease of viewing.

FIGS. 9 through 11 illustrate an alternative embodiment of a multiple-yoke main rotor assembly 99. Assembly 99 comprises components that are preferably interchangeable with those of assembly 37, as described above, such as the assemblies of outboard rotor 41 and inboard rotor 43. During operation on an aircraft, rotors 41, 43 are driven in rotation with mast 101 about mast axis 103. Likewise, swashplate 65 is actuated as described for assembly 37, for controlling the pitch of blades 39 and grips 59 about corresponding pitch axes 61.

To provide for teetering of each yoke 51 about the associated flap axis 49, an elongated, cylindrical outer sleeve 105 has two integral, opposing, coaxial trunnions 107 extending radially outward. As described for assembly 37, trunnions 107 are received within bearings 89 for connecting pillow blocks 85 to trunnions 107. Sleeve 105 has flanges 109 at opposing ends and a central aperture 111 sized for receiving cylindrical elastomeric bearing 113. Likewise, bearing 113 has flanges 115 at opposing ends and a central aperture 117 sized for receiving cylindrical inner sleeve 119. Inner sleeve 119 comprises flanges 121 at opposing ends and a central aperture 123 sized for receiving a portion of mast 101. Aperture 123 has interior splines 125 for engaging exterior splines 127 on mast 101, and this connection maintains the angular orientation of inner sleeve 119 relative to mast 101 about mast axis 103. When assembled, the central portion of bearing 113 is adhered to both inner sleeve 119 and outer sleeve 105. Also, flanges 115 of bearing 113 are positioned between and adhered to flanges 109 of outer sleeve 105 and flanges 121 of inner sleeve 119, so as to act as thrust bearings. During rotation of assembly 99 with mast 101, a limited amount of rotation of each outer sleeve 105 relative to mast 103 and inner sleeve 119 is allowed through elastic deformation of bearing 113.

In the embodiment shown, the two assemblies of sleeves 105, 119 are spaced from each other along the length of mast 101, which provides for flap axes 49 being spaced from each other. This determines the position of the attached rotor 41, 43 on mast 101 Also, flap axes 49, which are perpendicular to mast axis 103, are shown as being "clocked" 60 degrees relative to each other about mast axis, when viewed axially along mast axis 103, from a perpendicular orientation. Flap axes 49 may alternatively be oriented at other angles relative to each other.

In order to control the relative lead/lag rotation of rotors 41, 43 about mast 101, it may be desirable to provide an optional torque splitter 129. Torque splitter 129 comprises a middle sleeve 131 having two integral, opposing, coaxial trunnions 133 extending radially outward and defining a toggle axis 135. Middle sleeve 131 comprises a central aperture sized for receiving a portion of mast 101, and the aperture has interior splines (not shown) for engaging splines 127 on mast 101. When installed on mast 101, middle sleeve 131 is rigidly connected to mast 101. Each of outer sleeves 105 has two integral, opposing, coaxial trunnions 137, which are located between trunnions 107 and trunnions 133 of middle sleeve 131. Each of a pair of toggles 139 has a pivot aperture 141 sized for pivotally receiving trunnion 133, allowing for rotation of toggle 139 relative to middle sleeve 131 about toggle axis 135. Apertures 143 on opposing portions of toggle 139 are sized to receive a bearing 145, which connects each end portion of toggle 139 to the associated trunnions 137 of outer sleeves 105. It should be noted that the axes of trunnions 137 of both sleeves 105 are coplanar together with toggle axis 135. Because toggles 139 pivot about toggle axis 135 and are connected to trunnions 137 on opposite sides of axis 135, toggles 139 act to cause opposing relative motion of outer sleeves 105, and the attached rotors 41, 43, about mast axis 103. Toggles 139 also provide an additional limit to the amount of relative motion between outer sleeves 105 and mast 101. Whereas torque splitter 129 is shown as a toggle-type of splitter, it should be noted that other appropriate types of splitters may be used.

In operation, supplied torque drives mast 101 in rotation about mast axis 103, and splines 127 of mast 101 transfer the rotational motion to the splines of middle sleeve 131. Middle sleeve 131 transfers the rotational motion of mast 101 from trunnions 133 to outer sleeves 105 through trunnions 137 using toggles 139. As outer sleeves 105 rotate with mast 101, trunnions 107 cause pillow blocks 85 to rotate with sleeve 105 about mast axis 103. Pillow blocks 85 are attached to yoke 51, which causes yoke 51 to rotate with mast 101. While rotating about mast axis 103, yoke 51 and pillow blocks 85 are free to pivot relative to mast 101 and outer sleeve 105 about flap axis 49. This allows for flapping by teetering of each rotor 41, 43 about the associated flap axis 49. In addition, torque splitter 129 allows for limited opposing, relative motion between outer sleeves 105 through pivoting of toggles 139.

Toggles 139 are shown as having equal lever arms defined by inboard and outboard apertures 143 being equidistant from pivot aperture 141, which provides for a 1:1 motion ratio and approximately equalized torque loads between outer sleeves 105. However, it should be noted that toggles 139 may be configured to have unequal lever arms by locating apertures 143 (and the associated trunnions 137) unequal distances from pivot aperture 143. This would provide for a motion ration other than 1:1 and differing torque loads on outer sleeves 105. For example, if drag on rotors 41, 43 is not equal, as may be experienced due to the different airstream conditions experienced by rotors 41, 43, toggles 139 with unequal length lever arms may be used to balance torque loads.

Figure 12:
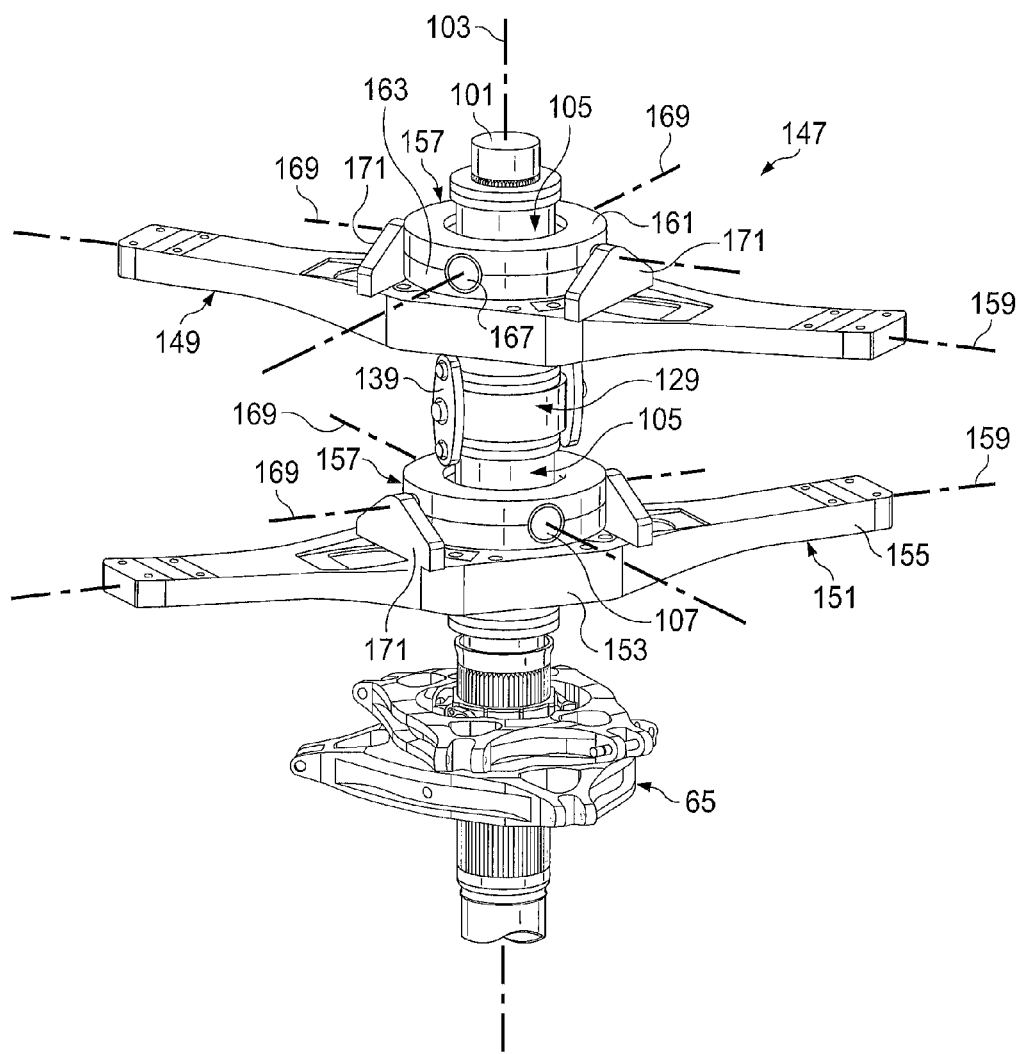
FIG. 12 is an enlarged oblique view of an alternative embodiment of a multiple-yoke main rotor assembly, portions of the assembly having been removed for ease of viewing.
Figure 13:
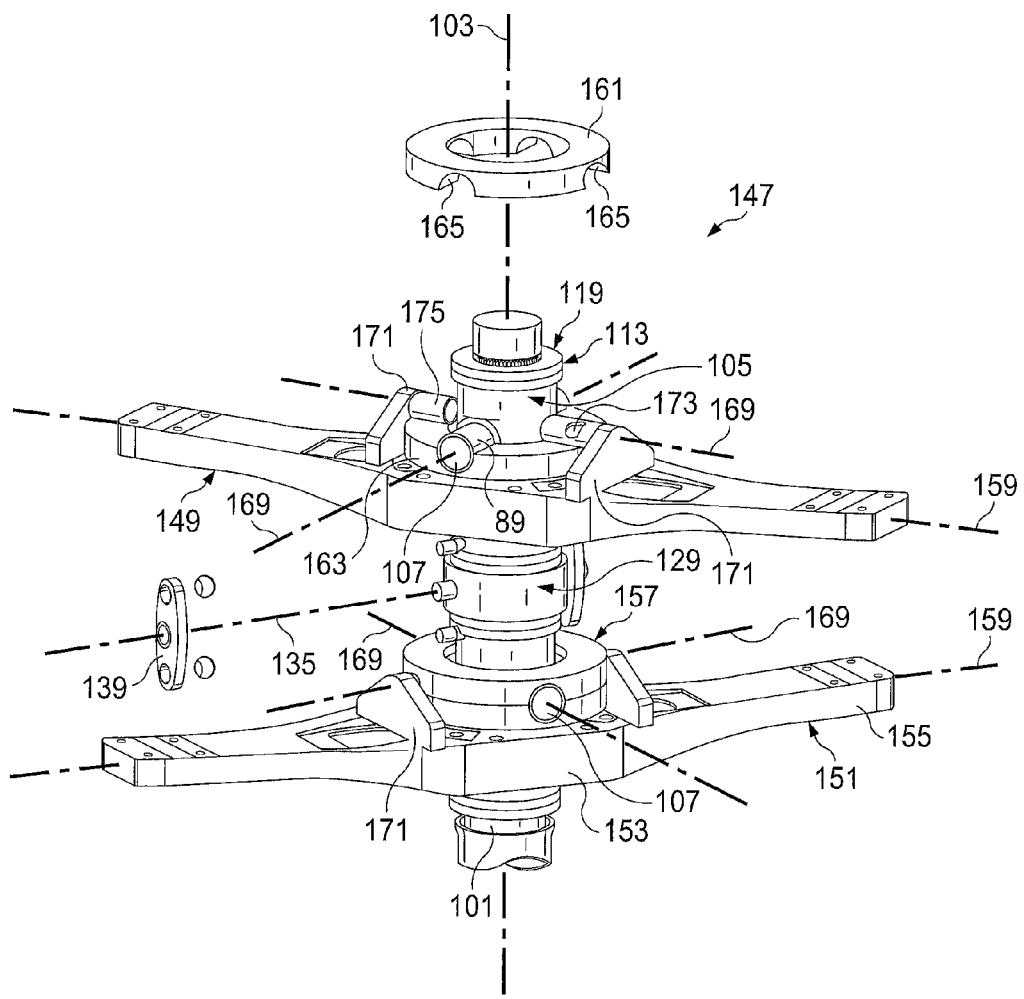
FIG. 13 is an oblique exploded view of the rotor assembly of FIG. 12, portions of the assembly having been removed for ease of viewing.

FIGS. 12 and 13 show portions of an alternative embodiment of a multiple-yoke main rotor assembly 147. Gimbaled assembly 147 comprises yokes 149, 151 which have a flat central section 153 and arms 155 extending radially therefrom. Instead of a teetering configuration having a single flap axis for each yoke 149, 151, yokes 149, 151 are each connected by a gimbal 157 to the associated outer sleeve 105, which is connected to mast 101 through bearing 113 and inner sleeve 119, as described above for main rotor assembly 99. Also, torque splitter 129 connects outer sleeves 105 with toggles 139, as described above for assembly 99, and provides for control over the relative lead/lag motion between outer sleeves 105 (and yokes 149, 151) about mast axis 103 by pivoting toggles about toggle axis 135. Yokes 149, 151, as for yokes 51 above, are configured for attachment of blades 39 and grips 59, so that blades 39 and grips 59 pivot about pitch axes 159. Swashplate 65 is provided to control the pitch of blades 39 and grips 59.

Each gimbal 157 is a formed as a toroid and comprises an outboard section 161 and an inboard section 163. Each section 161, 163 has two pair of opposing, coaxial, semi-cylindrical reliefs 165, such that when sections 161, 163 are assembled together, two pair of opposing cylindrical apertures 167 are formed. Each opposing pair of apertures 167 defines a flap axis 169 perpendicular to mast axis 103, and flap axes 169 are perpendicular to each other as oriented about mast axis 103. Though flap axes 169 are perpendicular to each other, yokes 149, 151 may be oriented at a different angle to each other about mast axis 103. For example, yokes 149, 151 are shown as being "clocked" at 60 degrees from perpendicular to each other.

Each yoke 149, 151 has a pair of opposing brackets 171 extending outboard from the outboard surface of yoke 149, 151. Each bracket has a gimbal trunnion 173 extending radially inward toward mast 101, each gimbal trunnion 173 having a bearing 175 for connecting trunnions 173 to one pair of opposing apertures 167 sized to receive bearings 175. This allows yokes 149, 151 to rotate about flap axis 169 defined by trunnions 173. The other pair of apertures is sized for receiving bearing 89, and bearings 89 connect gimbal 157 to trunnions 107 of outer sleeve 105, allowing yokes 149, 151 to rotate about flap axis 169 defined by trunnions 107.

In operation, supplied torque drives mast 101 in rotation about mast axis 103, and splines 127 of mast 101 transfer the rotational motion to the splines of middle sleeve 131. Middle sleeve 131 transfers the rotational motion of mast 101 from trunnions 133 to outer sleeves 105 through trunnions 137 using toggles 139. As outer sleeves 105 rotate with mast 101, trunnions 107 cause gimbal 157 to rotate with sleeve 105 about mast axis 103. Gimbals 157 transfer the rotational motion to yokes 149, 151 through trunnions 173 and brackets 171. While rotating about mast axis 103, yokes 149, 151 are free to pivot relative to mast 101 and outer sleeve 105 about perpendicular flap axes 169. This allows for flapping by gimbaling of each yoke 149, 151 and the attached blades about the associated flap axes 169. In addition, torque splitter 129 allows for limited opposing, relative lead/lag motion between outer sleeves 105 through pivoting of toggles 139.

Figure 14:
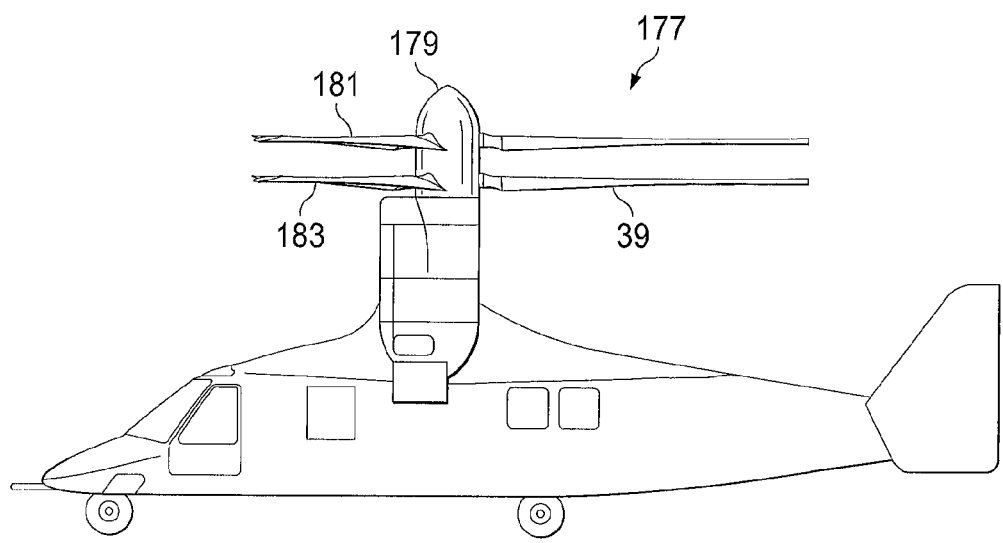
FIG. 14 is a side view of an aircraft having an alternative embodiment of a multiple-yoke main rotor assembly installed thereon.
Figure 15:
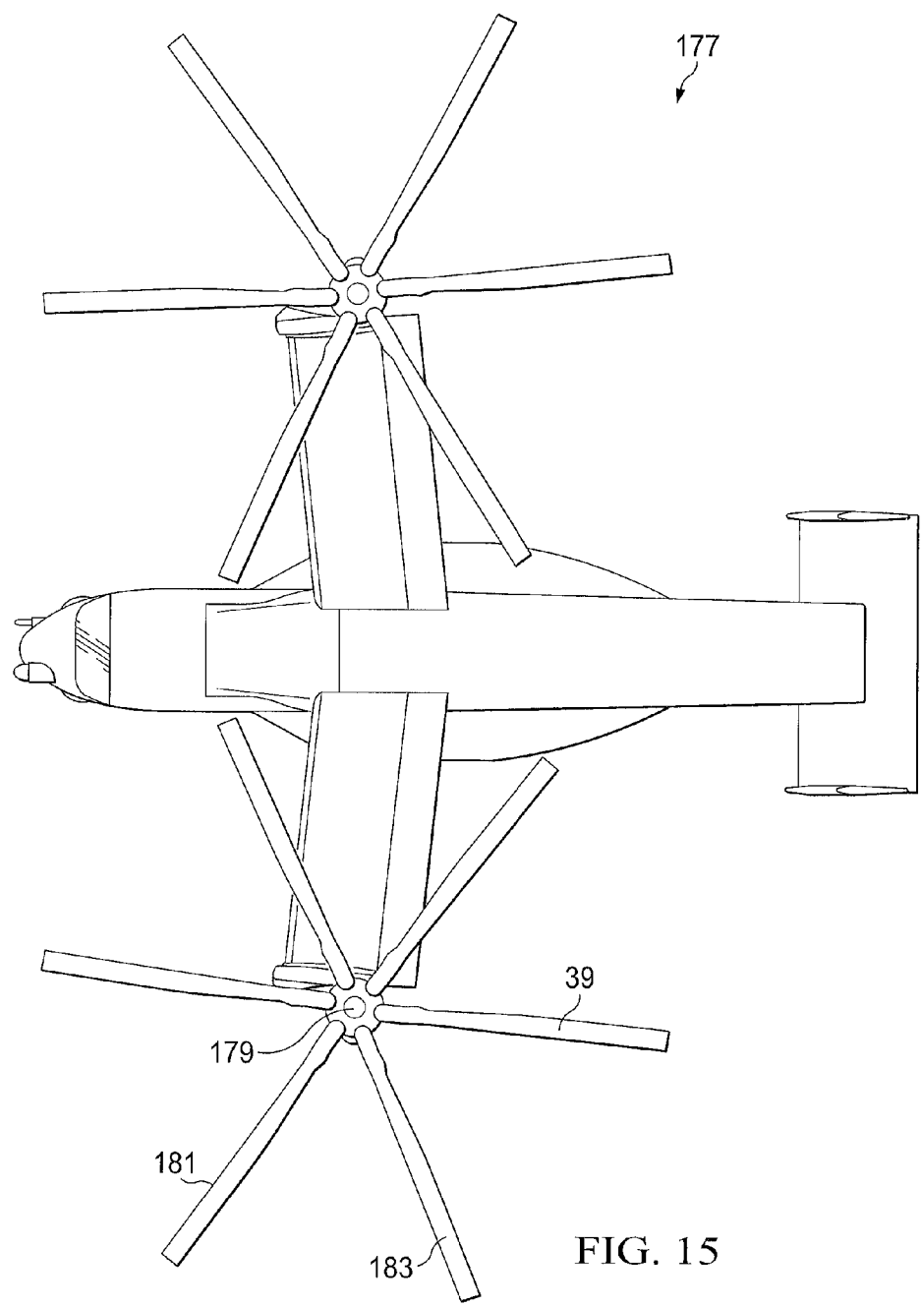
FIG. 15 is a top view of the aircraft of FIG. 14.

Though shown as having yokes 149, 151 configured for attachment on two opposing blades, gimbaled assembly 147 is also able to accommodate yokes configured for attachment of more than two blades. For example, FIGS. 14 and 15 show an aircraft 177, similar to aircraft 29 above, with multiple-yoke main rotor assemblies 179. Each assembly is constructed in a configuration like that of gimbaled assembly 147, as described above, but each assembly 179 comprising an outboard rotor 181 and an inboard rotor 183. Each rotor 181, 183 has a yoke configured for attachment of three blades 39, and rotors 181, 183 are "clocked" relative to each other 30 degrees, arranging all blades 39 in a regular array about the mast axis. Though gimbal 157 is shown as having two discrete flap axes 169, alternative gimbaling configurations may be used.

The system of the present application provides significant advantages, including: (1) providing a multiple-yoke main rotor assembly; (2) providing a main rotor system in which rotors can flap independently in response to air loads for each rotor; and (3) providing a main rotor system in which rotors can move in lead and lag relative to each other to reduce loads on the rotors.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A main rotor assembly for an aircraft, the rotor assembly comprising:
   a main rotor mast configured for rotation about a mast axis;
   two yokes pivotally connected to the mast for rotation therewith about the mast axis, each yoke being independently pivotable relative to the mast about at least one flap axis generally perpendicular to the mast axis;
   a torque splitter connecting the yokes and transferring torque from the mast to the yokes, the torque splitter allowing for limited rotation of the yokes relative to each other about the mast axis;
   wherein each yoke is configured for the attachment of rotor blades extending generally radially relative to the mast axis.

2. The rotor assembly of claim 1, wherein the flap axes are spaced from each other along a length of the mast axis.

3. The rotor assembly of claim 1, wherein the flap axes are angularly oriented about the mast axis so that the flap axes are perpendicular to each other.

4. The rotor assembly of claim 1, wherein the flap axes are angularly oriented about the mast axis so that the flap axes are non-perpendicular to each other.

5. The rotor assembly of claim 1, wherein each yoke is connected to the mast with a teetering configuration, allowing each yoke to pivot relative to the mast about one associated flap axis.

6. The rotor assembly of claim 1, wherein each yoke is connected to the mast with a gimbal configuration, allowing each yoke to pivot relative to the mast about at least two associated flap axes.

7. The rotor assembly of claim 1, further comprising:
   a sleeve for connecting each yoke to the mast, each sleeve having a pivot for defining one corresponding flap axis, the torque splitter connecting the sleeves and allowing for limited rotation of the sleeves relative to each other about the mast axis.

8. An aircraft having a main rotor assembly, the aircraft comprising:
   a main rotor mast configured for rotation about a mast axis;
   two yokes pivotally connected to the mast for rotation therewith about the mast axis, each yoke being independently pivotable relative to the mast about at least one flap axis generally perpendicular to the mast axis;
   a torque splitter connecting the yokes and transferring torque from the mast to the yokes, the torque splitter allowing for limited rotation of the yokes relative to each other about the mast axis;
   wherein each yoke is configured for the attachment of rotor blades extending generally radially relative to the mast axis.

9. The aircraft of claim 8, wherein the flap axes are spaced from each other along a length of the mast axis.

10. The aircraft of claim 8, wherein each yoke is connected to the mast with a teetering configuration, allowing each yoke to pivot relative to the mast about one associated flap axis.

11. The aircraft of claim 8, wherein each yoke is connected to the mast with a gimbal configuration, allowing each yoke to pivot relative to the mast about at least two associated flap axes.

12. The aircraft of claim 8, further comprising:
a sleeve for connecting each yoke to the mast, each sleeve having a pivot for defining one corresponding flap axis, the torque splitter connecting the sleeves and allowing for limited rotation of the sleeves relative to each other about the mast axis.

\* \* \* \* \*